July 27, 1971 J. B. RUST 3,595,664

PHOTOSENSITIVE CONDENSATION POLYMERS AND THE PROCESS OF MAKING SAME

Filed March 20, 1968

INVENTOR
JOHN B. RUST,
BY
Ralton V. [illegible]
ATTORNEY.

United States Patent Office 3,595,664
Patented July 27, 1971

3,595,664
PHOTOSENSITIVE CONDENSATION POLYMERS AND THE PROCESS OF MAKING SAME

John B. Rust, Los Angeles, Calif., assignor to Hughes Aircraft Company, Culver City, Calif.

Filed Mar. 20, 1968, Ser. No. 714,532
Int. Cl. G03c *9/00, 1/68*
U.S. Cl. 96—35.1 8 Claims

ABSTRACT OF THE DISCLOSURE

Method of producing transparent and colored resinous film by differential polymerization of compositions of polymerizable monomers and polymers from water-soluble and solvent soluble materials providing polymers derived from the condensation or combined addition and condensation reaction of (A) a formaldehyde material, (B) a photosensitive amide of an olefinic carboxylic acid or the photosensitive derivatives thereof, and (C) a cyanamide derivative as a member of the group consisting of thiourea, urea, guanidine and melamine, derivatives, and mixtures thereof, with or without (D) the soluble mono and polyvalent salts and salt reagents useful in photosensitivity, which compositions and polymers are photopolymerizable in the presence of a light activated catalyst to produce photopolymer masses by addition polymerization and simultaneously therewith or before or after condensation polymers are formed.

Figure 1:
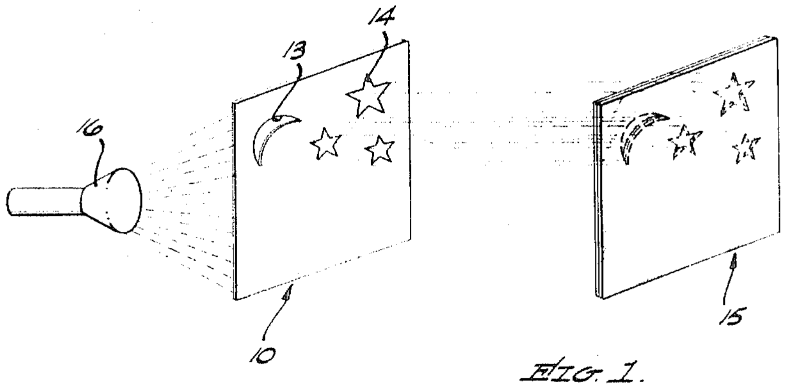

Thus, are provided photosensitive resinous compositions formed of monomers self-curable by condensation polymerization and/or addition polymerization, and in the presence of color provide uniform or multivaried colored imaging, in viewing or projection.

There is herein provided, a method for making and methods of utilizing a composite photosensitive resin composition, with or without imaging therein effected by differential polymerization, as illustrated by a mixture of the foregoing chemical compounds. The photosensitive polymer composition is prepared in preferred condensation water soluble prepolymer form comprising the step of heating a homogeneous mixture of (a), (b) and (c) to a temperature substantially above room temperature, the mixture preferably having a pH above 7 and a method of producing solvent soluble, photosensitive polymer therefrom comprising reacting the water-soluble condensation polymer with an alcohol at an elevated temperature and preferably at a pH less than 7, and to which a photosensitive polymerization catalyst may be added for addition photopolymerization of the prepolymer, with or without subsequent cure by further differential condensation polymerization.

This invention relates to the preparation of photosensitive compositions and polymers and products thereof. More particularly, the invention relates to the preparation of resinous forming photosensitive condensation and addition reactant compositions which, upon irradiation with actinic energy can be cured by addition polymerization to form hard infusible polymers, or photosensitized to form addition polymers and cured by condensation polymerization, and effecting transparent and colored imaging in solid film form, by differential polymerization.

In photopolymer photography a visible image is formed which consists of polymerized monomer. To preserve image detail, the polymer material comprising the image must be resistant to both chemical and physical attack. For example, during fixing when the light-sensitive material surrounding the image is removed, the photopolymer image must not be disturbed by the washing medium. During handling of film containing a photopolymer image, the image must be capable of withstanding physical abuse. Thus, the photopolymer image must consist of a polymeric material which is hard, insoluble and infusible. In addition, the art is desirous of obtaining further knowledge in the art of colored film imaging in the field of photopolymer photography.

Heretofore, photopolymers in general have not been able to withstand either extensive chemical or extensive physical attack. As a result prior art photopolymers tend to lose definition too rapidly to be of value in areas where long-term use is required. Further, a composite of polymer color imaging of differentially polymerized film and method therefor, as provided herein is believed to be unknown to the art.

The preferred method of this invention comprises a first step of forming a photosensitive prepolymer from a reaction mixture comprising (A) a formaldehyde material (B), an amide of an olefinic carboxylic acid, or derivatives and mixtures thereof, and (C) a cyanamide derivative material in amine or amide form as a member of the group consisting of thiourea, urea, guanidine, melamine, including derivatives and mixtures of the same. The resulting photosensitive prepolymers may be made solvent soluble by further reaction with an alcohol. The reaction components or products of either of the foregoing reactions may be combined as a composite mixture with a photosensitive catalyst and irradiated with actinic light with or without the admixture therewith of additional photosensitive acrylic or vinyl material, to form a hard, infusible polymer, or a mixture of the above photosensitive components, prepared with photosensitive catalyst material, with or without the addition of a coloring agent, or agents, can be photopolymerized by addition polymerization and cured by condensation polymerization, or conversely effecting condensation polymerization in a design pattern and sequentially or simultaneously effecting curing with addition polymerization, as is embodied herein. Also contemplated herein, as indicated, are mixtures of the above including the addition thereto of the mono- and/or polyvalent metal salts of photosensitive compounds including the reactants of acrylic and vinyl carboxylic acids with metal oxides, metal hydroxide and metal carbonates providing photosensitive compositions. These photosensitive condensation polymerizable compositions in combination with colored dye material, as an addition polymerization initiator, and other dye or pigment coloring material, or mixtures thereof provide photosensitized polymer imaged films in solid multiple color, as the compounder and operator may desire.

The preferred prepolymers of this invention contain a large number of reaction sites, that is, a large number of olefinic groups at which polymerization can take place. Although water or solvent soluble, the prepolymers of this invention are large, relatively complex, molecules. Therefore, the polymers produced from these prepolymers are large, highly cross-linked, high molecular weight molecules which are highly resistant to either chemical (because of the low ratio of reactive sites per unit molecular weight) or mechanical attack (because of the highly cross-linked nature of the molecules).

I have now discovered that hard insoluble and infusible polymers may be formed by photopolymerization of prepolymers formed from a reaction mixture containing (1) a formaldehyde material, (2) an amide of an olefinic carboxylic acid, and (3) a member of the group consisting of thiourea, urea, guanidine, melamine, derivatives thereof, and mixtures of the same, including mixtures therewith of the soluble mono- and polyvalent metal salts of such reactants, and, if desired, modified mixtures thereof with the polyvalent metal salts of acrylic and methacrylic compounds. The prepolymers herein described are soluble, fusible copolymers of moderate molecular weight, and, in addition, they are highly photosensitive in the presence of photopolymerization-initiating catalysts. Additionally, the solubility characteristics of my prepolymers can be altered so that a homogeneous, light-sensitive composition comprising my prepolymer and a photopolymerization-initiating catalyst in an appropriate solvent medium can be produced. Photopolymerization of the prepolymer may be carried out with a variety of known photosensitive catalysts to form photopolymers capable of withstanding both chemical and physical abuse over long periods. Because of the unique properties of the photopolymers formed from these condensation prepolymers, photopolymer images having outstanding definition can be produced from these photopolymers. For example, imaging radiation or illumination of an object or negative cast upon a film of the initially prepared prepolymer and catalyst combination embodied herein effects a photosensitive addition reproduction of the object or image therein. Thereafter, or simultaneously therewith, by condensation polymerization, the balance of the mass can be cured with the image retained therein for projection or otherwise viewing.

Figure 2:
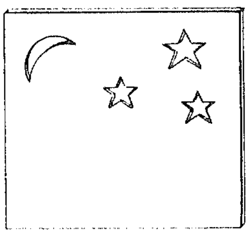

The embodiments of my discoveries and developments are illustrated and exemplified in the following examples and by the accompanying drawing, wherein:

FIG. 1 is an illustrative diagrammatic view of projecting an image onto a monomer or polymer film and FIG. 2 is an isometric view of the polymerized film with an image impressed therein.

My invention embodies and comprises preparing photosensitive mixtures and photopolymer resins thereof, with or without the reproduction of image coloring therein. The compositions are exemplified by the preferred combination of photosensitive condensation polymers of melamine and formaldehyde modified by an acrylamide or its derivatives. In other words, there is provided herein a method of mixing components forming a composite of condensation polymers with light-sensitive addition forming polymers and effecting with a light-sensitive addition polymerization initiator, including dye material, photographic imaging in black and white, solid or multiple coloring, for viewing or projection, as illustrative thereof. The preferred method embodies preparing mixtures and prepolymers of an amide of an olefinic carboxylic acid and a cyanamide derivative or an amine or amide component such as thiourea, urea, guanidine, melamine, derivatives thereof, and mixtures of the same, with formaldehyde, with a photo initiating catalyst material, with or without added coloring material, and deriving the products thereof in composite solid and film form, including imaging and development by differential polymerization.

The molecular weight of the resutling soluble pre-polymers is controlled by adjusting the pH of the reaction mixture and by regulating the reaction condition so that the photopolymerizable prepolymers remain fusible and soluble. The prepolymers so formed may be modified by condensation with alcohols to make the prepolymers soluble in a variety of organic solvents. In the preferred form, the prepolymer or the alcohol-modified derivatives are then irradiated, in the presence of a photosensitive catalyst, with radiation of appropriate wavelengths. By such photopolymerization, the prepolymers cure to hard, insoluble, and infusible photopolymers. The physical and chemical photosensitive and final properties of the photopolymers may be tailored to the requirements of the particular application by self-selection in varying the ratio of the starting monomers and the conditions of polymerization as the operator desires.

As the amide of an olefinic carboxylic acid, I prefer to use acrylamide because of its availability and relatively low cost. However, I may also employ photosensitive derivatives thereof as N,N'-methylene bisacrylamide, methacrylamide, N,N'-methylene bismethacrylamide, and acrylamide and methacrylamide derivatives of the general formula $CH_2{=}CHCONHR$ and $CH_2{=}C(CH_3)CONHR$, respectively, where R can be hydrogen, an alkyl, aryl, alkaryl or aralkyl groups. Additionally, I may use N-vinyl derivatives and N,N'-divinyl derivatives of amides of the general formula $RCONHCH{=}CH_2$ and $$H_2C{=}HCHNOC{-}R{-}CONHCH{=}CH_2$$

respectively, where R can be hydrogen in the N-vinyl formula or an alkyl, aryl, alkaryl, or aralkyl group in both formulae, and having, preferably, 10 or less carbon atoms in each alkyl, aryl, aralkyl or alkaryl group. An example of the N, N'-divinyl compounds is N, N'-divinyl succinamide. Amino salts of dicarboxylic olefinic acids may be used. For example, the mono- and diamino salts of maleic acid can be substituted for acrylamide.

Less preferably, other soluble photosensitive mono and polyvalent metal salt derivatives of the compounds of the reaction mixture are included, if desired, to augment the photosensitive addition polymerization without effecting condensation polymerization. The metals forming such salts are barium, mercury, lead, calcium, strontium, and the like and may otherwise be added in the reactive forms as oxides, hydroxides, or carbonates, and mixtures thereof. The salt component of the composition may be effected by prereaction, or in-situ reaction, of mixtures of the acid and the metal oxides, metal hydroxides or metal carbonates. Such compounds may be, for example, barium diacrylate, lead diacrylate, neodymium triacrylate, mercuric diacrylate and the like.

As illustrated in the preferred examples, I may use such substituted and unsubstituted aliphatic amine and amide compounds as thiourea, dicyan diamide, aminoguanidine, guanimines, guanidine, urea, and triazines as melamine, including derivatives and alkyl and aryl substituted derivatives as otherwise may be exemplified by biguanide, amino guanidine, dicyanodiamide, biuret, N-aminourea, alkyl ureas, isothiourea, isourea, N-aminomelamine derivatives and substituted derivatives of barbituric acid, purines, guanamides, amino guanidine, guanylhydrazine, dicyanimide, mixtures of such compounds, and the like in photosensitive combination as contemplated herein. In general, aromatic amines, as such, may not be used because of their inhibitory effect on addition polymerization. Hereinafter, in the claims, the group of the class comprising the above and the like will be designated "cyanamide derivatives" or operable "cyanamide constituent" for convenience and brevity. The formaldehyde material is preferably simply formaldehyde, however, paraformaldehyde, hexamethylene tetramine, polyoxymethylene, trioxane and the like formaldehyde donors may be used.

The interaction of formaldehyde, the cyanamide derivative, and an amide of an olefinic carboxylic acid is a condensation reaction, that is, water is released as the prepolymer is formed. The following Equation 1 illustrates the idealized result of reacting together formaldehyde, acrylamide, and melamine:

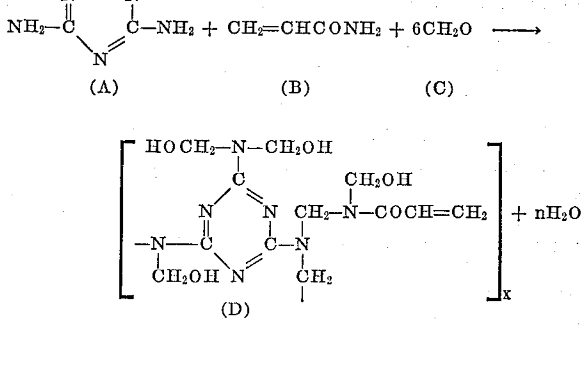

and/or

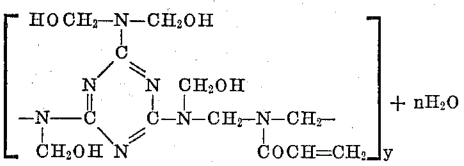

(E)

In Equation 1 A is melamine, B is acrylamide, C is formaldehyde, D and E illustrate alternative forms of the resulting prepolymers, and *x*, *y*, and *n* are integers used to indicate the moderately high molecular weight nature of the condensation polymers. In comparison with the condensation reaction producing the prepolymer, photopolymerization of the prepolymer takes place by addition at the olefinic groups in the prepolymer.

In the preferred form for photopolymerization, the cyanamide derivative, amide of an olefinic carboxylic acid and formaldehyde constituents are reacted together until a prepolymer of moderate molecular weight is obtained. The molecular weight of the prepolymer varies from about 100 to about 20,000 in the same prepolymer composition. Because the prepolymer molecular weight distribution is unknown, no average molecular weight can be given. The term "moderate molecular weight" can be given. The term "moderate molecular weight" is, therefore, defined in terms of the solubility of the prepolymer in the particular solvent employed in the reaction medium. When the prepolymer is no longer soluble in the reaction medium, the prepolymer is generally characterized by cross-linking of the prepolymer molecules. Such cross-linking produces an insoluble, infusible mass of high molecular weight which is substantially immune to further reaction and is thus unsuitable for further polymerization purposes.

In the preparation of the soluble prepolymers, the size of the prepolymer molecules can be controlled by controlling the heat of the reaction and by maintaining the pH of the reaction mixture between specific limits. As copolymerization of the cyanamide derivative-formaldehyde-acrylamide constituents takes place, heat is liberated. The liberated heat, in turn, causes the rate of the copolymerization reaction to increase if the liberated heat cannot escape from the reaction mixture. Therefore, to control the rate of reaction and thereby the molecular weight of the prepolymer, the reaction mixture may be placed within a coolant for example, a water bath. With external cooling, the temperature of the reaction mixture can be controlled so that the copolymerization reaction takes place at a controllable rate and so that the copolymerization reaction may be stopped when the desired molecular weight of the prepolymer is reached.

The temperature of the reaction mixture and the length of time during which the reaction continues are chosen to satisfy the requirements of the particular application. However, the time and temperature parameters will, in each instance, be determined by considering and balancing the following two temperature-dependent factors. First, the rate of copolymerization increases with increasing temperature and, secondly, control of the copolymerization generally decreases with increasing temperature. Thus, where a high rate of polymerization is required, the reaction temperature will be high. However, if large batches of reaction mixture are employed, it may be found that at such high temperatures, the copolymerization becomes uncontrollable and that the resulting product is an unusable, highly cross-linked, insoluble mass. I have found that reaction temperatures substantially above room temperature, for example, between about 50° C. and 80° C. provide a satisfactory balance between rate of copolymerization and control of the reaction.

Determination of the length of time to conduct the copolymerization reaction, for any particular combination, at any fixed temperature, can be determined in the laboratory with small samples. After each test, the prepolymer can be precipitated out of the reaction mixture and the physical properties of the prepolymer can be measured. When desirable results are produced, production may be begun using the laboratory-derived conditions.

Control of the molecular weight of the prepolymer by cooling the reaction mixture is preferably used only with small, for example, laboratory reaction mixtures, because the heat transfer problems associated with large production quantities makes control of the reaction temperature difficult. Instead, prepolymer molecular weight control in production quantities of reaction mixture is preferably effected by controlling the pH of the reaction mixture.

The pH of the photosensitive reaction mixture is, in general, maintained between about pH 7 and about pH 9. Preferably the pH of the reaction mixture is maintained at a pH of about 8. Below about pH 7, the rate of condensation reaction increases rapidly with release of heat. With small amounts of reaction mixture, a pH of less than 7 may be used because such small batches can be quenched in cold baths relatively easily to slow the rate of copolymerization. However, with large batches at pH's less than 7, the reaction becomes uncontrollable. The result is the production of insoluble, infusible polymers unsuitable for photopolymerization. Above about pH 9, a Cannizzaro reaction occurs in which two aldehyde groups react with each other to produce an alcohol and a carboxylic acid at the expense of the aldehyde groups. Such interaction of the aldehyde groups significantly reduces the amount of photosensitive prepolymer formed from the reaction of formaldehyde, acrylamide and melamine. Additionally, colored products which can seriously affect the quality of a light-sensitive composition may be formed by Cannizzaro reaction.

To maintain a basic pH, various alkaline compounds can be added to the initial reaction mixture. However, I prefer to use weak alkaline compounds which provide a buffering action so that the pH remains alkaline and relatively constant throughout the reaction. For example, I have found that disodium hydrogen phosphate satisfactorily buffers at an alkaline pH. I may also use alkalis having negligible buffering action such as solutions of potassium hydroxide and sodium hydroxide.

The physical properties of the prepolymers and of the final photopolymers can be altered by varying the proportions of the formaldehyde, amide of an olefinic carboxylic acid or cyanamide constituents in the reaction mixture. The photosensitivity of the prepolymers may be altered in the same manner. Where higher molecular weight prepolymers are desired, without varying the prepolymer chain length, the proportion of, for example, melamine in the reaction mixture can be increased. This increases the number of melamine units in the prepolymer chain, thereby increasing the molecular weight of each prepolymer chain without increasing the chain length. Where the photosensitivity of the prepolymer is to be increased, for example, the proportion of the amide of an olefinic carboxylic acid in the reaction mixture is increased, or the salt component of the mixture is increased. The increase of an olefinic portion places more olefinic groups in each prepolymer chain and thereby increases the number of points at which free radical formation may take place. Not only is photosensitivity of the prepolymer increased in this manner but, in addition, increasing the number of points at which free radicals may be formed increases the amount of cross-linking among the prepolymer units. This increased cross-linking produces photopolymers of superior toughness and durability.

As has previously been noted and as can be seen from Equation 1, water is formed in the reaction mixture. If this water remains in the reaction mixture, it will tend to reduce the yield of prepolymer. Therefore, it is preferable to condense out the water of reaction as the formation of prepolymer chains progresses. Conventional condenser or azeotropic condenser means may be used.

The prepolymers, produced as heretofore described, are water soluble but only slightly soluble, if at all, in organic solvents. It may be necessary in some applications to use organic solvents and, when such solvents are used, it is necessary to modify the prepolymers to make them soluble in the particular organic solvent being used. Solubility in organic solvents can be imparted to the prepolymers by reacting the prepolymers with monohydric alcohols which react with the hydroxyl groups in the prepolymer chains to form ether linkages. At the same time, water is liberated by this reaction. The monohydric alcohol may be present initially in very small amounts, e.g., catalytic amounts.

This solubility modification reaction is illustrated by the following idealized equation:

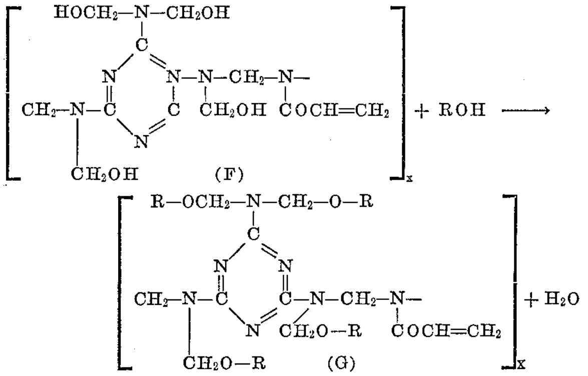

in which F is a water-soluble prepolymer which is relatively insoluble in organic solvents, G is a modified prepolymer which is relatively soluble in organic solvents, R represents alkyl, aryl and cycloalkyl groups and $x$ is an integer, as defined.

This reaction is carried out at pH's below about 7 and preferably in the substantial absence of water. The pH is maintained below about pH 7 because, in alkaline solutions, condensation of the monohydric alcohol with the prepolymer will not occur. Condensation of the monohydric alcohol with the prepolymer is effected and accelerated by the presence of hydrogen ions in the alcohol-prepolymer medium. Thus it would be advantageous from a rate of reaction standpoint to employ highly acidic solutions; however, as the pH decreases ,the tendency of the prepolymer units to interact by cross-linking increases. Thus, in each application, the rate of condensation of monohydric alcohols with the prepolymer units must be balanced against the rate of cross-linking among the same prepolymer units when selecting the optimum pH at which to maintain the alcohol-prepolymer reaction mixture. I have found that when the alcohol-prepolymer reaction mixture is maintained at a pH of about 6.0 to about 7.0, the monohydric alcohol condensation with the prepolymer units progresses rapidly without formation of an insoluble mass by cross-linking among the prepolymer units.

It is also preferable to condense the monohydric alcohol with the prepolymer units in the substantial absence of water. As can be seen from Equation 2, water is formed by the interaction between the monohydric alcohol and the prepolymer. In accordance with the mass-action law, the rate of production of modified prepolymer (F) will be accelerated by decreasing the amount of water in the reaction medium. Therefore, it is advantageous to begin the monohydric alcohol-prepolymer reaction with substantially no water present and to remove water formed in the condensation reaction as the reaction progresses.

Removal of the water may be accomplished by azeotropic distillation, by vacuum, or by entrainment techniques. Azeotropic distillation is preferred when the monohydric alcohol is relatively insoluble in the water, since this characteristic permits good separation of the water from the alcohol. The monohydric alcohol can be returned to the reaction mixture while the water is completely removed from the reaction.

I have found that monohydric alcohols such as ethanol, propanol, butanol, hexanol and benzyl alcohol may be used to produce organic-solvent soluble prepolymers. As the number of carbons in the alcohol increases, the solubility of the alcohol modified resin proportionately change. I have found that monohydric alcohols having up to about 12 carbons can be used to produce modified prepolymers which are soluble in a relatively large number of organic solvents. However, monohydric alcohols having greater than about 12 carbons may be employed although special organic solvents may be required to dissolve the resulting modified prepolymers. In place of monohydric alcohols, polyhydric alcohols may be used. However, unfavorable side reactions may occur when using polyhydric alcohols because of the multiple hydroxyl reaction points. For example, when using glycerol, an acetal may be produced which results in cross-linking between prepolymer chains. Such cross-linking may result in insoluble, infusible masses unsuitable for photo-polymerization purposes. The alcohol-modified prepolymers are soluble in a variety of organic solvents and organic solvent mixtures. In addition to water, I have used benzene, toluene, methanol, ethanol, and acetone.

Condensation of the monohydric alcohol with the prepolymer is preferably carried out in the temperature range between about 80° and 120° C. at normal atmospheric pressure. At these temperatures, condensation proceeds rapidly without adversely affecting any of the reaction components or products. As the reaction temperature drops substantially below 80° C., the rate of condensation decreases to values which may not be commercially feasible. To employ reaction temperatures in the range between about 80° and 120° C., without resorting to pressure changes, it is preferable to use a monohydric alcohol having a boiling point within this temperature range. For example, butanol is ideally suited for this purpose.

Instead of reacting an alcohol with the prepolymer, the alcohol may be included in the reaction mixture containing formaldehyde, acrylamide and a cyanamide derivative. When this method is employed, the water formed in the reaction should be drawn off so that a good yield of modified prepolymer (G) is produced. Because this method may produce side reactions which may reduce the size of the prepolymer, it is preferable to modify the prepolymer units after the prepolymer is formed.

The preploymers produced as described vary in photosensitivity depending upon the proportion of the amide of the olefinic carboxylic acid constituent used in the reaction mixture. However, it is necessary to carry out the prepolymer-forming reaction in the dark to avoid undesired photo-initiated addition polymerization of the prepolymer chains. Such highly photosensitive prepolymers must also be stored in the dark if they are not to be photopolymerized shortly after their formation.

Because of the increased photosensitivity of the prepolymers of my invention, a variety of the conventional photosensitive photopolymerization initiators may be employed to polymerize the prepolymers. The photopolymerization initiator may comrise a one or two component photo-catalyst system effecting imaging by visible and/or invisible radiation. Regardless of its composition, the preferred photopolymerization initiator, when irradiated wth actinic light is capable of producing free radicals capable of initiating polymerization of the prepolymer.

Where the photo-catalyst system is a single component, such component may absorb in the non-visible region, generally from about 200–3800 A., e.g., in the ultraviolet, or it may absorb in the visible region, e.g., between about 3800 A. and about 7200 A. As examples of preferred photo-cataylsts which absorb in the visible region, I may use photosensitive dyes such as members of the phenothiazine group such as thionine, or the phenoxazine group such as Capri Blue, and of the acridene group such as acridine yellow, and the like, including mixtures thereof, and mixtures therewith of suitable coloring material, in a desirable catalytic amount to the color shade desired.

Various and relative two-component photo-catalyst systems comprising a photo-oxidant and an electron donor may be used. For example, I may use rose bengal, phloxine, erythrosine, eosin, fluorescein, acriflavine, thionine and methylene blue as photo-oxidants and I may use stannous chloride, ascorbic acid, hydrazine triethanolamine, tetramethylethylenediamine, phenyl-hydrazine, and dichlorophenylhydrazine, and mixtures of such, electron donor material.

For extremely rapid photopolymerization I prefer to employ the photo-redox catalyst systems as herein illustrated and described in more detail in my copending patent applications entitled "Photopolymers and the Process of Making Same," Ser. Nos. 450,397 and 483,986, now abandoned and replaced by applications, Ser. Nos. 824,902 and 824,903, respectively, and assigned to the instant assignee (hereafter designated "my co-pending applications"). The photo-redox catalyst system, disclosed in my co-pending applications are incorporated herein by reference thereto.

These photo-redox catalyst systems include a photo-oxidant and a catalyst. For example, the photo-oxidants include: the quinoidal dyes such as phenothiazine dyes, phenazine dyes, acridine dyes and xanthene dyes, and suitable mixtures thereof.

The catalysts include: organic sulfinic compounds, phosphine compounds, and arsine compounds such as, organic sulfinic acids and ionizable derivatives thereof such as p-toluenesulfinic acid, naphthalenesulfinic acid, 4 - acetamidobenzenesulfinic acid, 5 - salicylsulfinic acid, ethanesulfinic acid, 1,4 - butanedisulfinic acid, and 2 - toluenesulfinic acid; salts of these organic sulfinic acids which are compatible with other components in the light-sensitive composition such as the sodium salts, the potassium salts, the lithium salts, the magnesium salts, the calcium salts, the barium salts, the silver salts, the zinc salts and the aluminum salts; esters of the organic sulfinic acids such as the methyl ester, the ethyl esters, the propyl esters and the butyl esters; halogen derivatives of the organic sulfinic acids such as the sulfinyl chlorides and bromides, for example ethane-sulfinyl chloride and 5-salicylsulfinyl bromide; and organic sulfinic amides such as the sulfinamides, for example ethane-sulfinamide, the N-alkylsulfinamides, for example, N-methyl p-toluene-sulfinamide, and the N-arylsulfinamides, for example, N-phenylbenzene-sulfinamide; triorgano-substituted phosphines such as tributyl phosphine, triphenyl phosphine, dibutylphenyl phoshine, methyl diphenyl phosphine, and methyl butylphenyl phosphine; and triorgano-substituted arsines such as triphenyl arsine, methyl diphenyl arsine, trioctylarsine, dibutylphenyl arsine and methylbutylphenyl arsine, including the like photoionizable derivatives of organo sulfinic phosphines and arsines, and mixtures thereof.

The photopolymerization initiator may be admixed with the primary components, that is, with the formaldehyde, an amide of an olefinic carboxylic acid and cyanamide constituents before they are reacted, or it is preferably mixed with the prepolymer. In either case, the composition containing the photopolymerization catalyst should be kept in the dark to avoid premature photopolymerization of the prepolymer in the light-sensitive composition. It is preferable, however, to add the photopolymerization catalyst to the prepolymer after the prepolymer has been formed. This preference exists because addition of the photopolymerization catalyst to the reaction mixture containing the formaldehyde, acrylamide and cyanamide constituents may lead to addition polymerization of the vinyl groups in addition to condensation polymerization. Such a result can occur when an addition polymerization catalyst is produced in the reaction by the combination of entrapped oxygen and the electron donor. Such a cataylst initiates addition polymerization when heated. If excessive addition polymerization occurs prior to image irradiation, the prepolymer loses its photosensitive characteristics and its usefulness as a photopolymer intermediate. However, when the mixtures are to be used as freshly prepared and initially photopolymerized with an image representation and subsequently fixed as by condensation polymerization, the addition polymerization is helpful.

The prepolymer-catalyst, with or without additional coloring material, admixture may comprise a solution or a dispersion. Preferably, a solution is employed in photo-imaging because a dispersion tends to scatter the incident radiation. When possible, a solvent capable of dissolving both the prepolymer and the radiation absorbing system is used. When no such common solvent exists, separate solvents which are mutually miscible may be employed. In general, the same solvents in which the prepolymer and alcohol-modified prepolymer are soluble can be used as the solvent for the pre-polymer-photopolymerization catalyst admixture. For example, the following solvents may be used: alcohols such as methanol and ethanol; esters such as methyl acetate; ketones such as acetone; and non-polar solvents such as benzene and toluene.

I have also found that it is preferable to remove free formaldehyde from the light-sensitive solutions. Although free formaldehyde does not appear to have any deleterious affect on the components in the light-sensitive composition, it does appear that free formaldehyde reduces the speed of the photopolymerization reaction: This reduction in photopolymerization speed is particularly noticeable with radiation absorbing systems other than the photo-redox catalyst systems of my co-pending application. Removal of the free formaldehyde can be accomplished by, for example, vacuum evaporation of the free formaldehyde from the prepolymer solution or from the light-sensitive solution.

The intensity and the wavelength range of the polymerization-initiating radiation will depend upon the particular combination of photosensitive composition, rate of photopolymerization desired and upon the characteristics of the radiation-absorbing system. In general, a wide range of intensities in the invisible and visible range may be employed. Preferably, radiation having wavelengths in the range of about 3800 A. to about 7200 A. is used.

More specifically, photosensitive prepolymers and photopolymers illustrative of my invention are further described by the following examples.

EXAMPLE I

This example illustrates the rapid formation of a hard, insoluble photopolymer after irradiation by light of a light-sensitive composition containing a photo-redox catalyst and a photosensitive prepolymer formed as described herein.

A composition containing the following components and amounts was made up.

12.6 gms. melamine
21.3 gms. acrylamide
48.6 ml. 37% formaldehyde solution (aqueous)
1.0 gm. disodium hydrogen phosphate The mixture was heated in a flask under a condenser with stirring to obtain a clear solution. Heating was continued at 50°–60° C. for one hour, cooled overnight, then heated again at 50°–60° C. for one hour. A clear non-viscous solution was obtained on cooling. The composition was heated at 50°–60° C. under aspirator vacuum to remove excess formaldehyde and water. A clear solution of moderate viscosity having a solids content of about 75% and a pH of about 8 was obtained. Although the above operation can be conducted in the light, it is desirable to effect the condensation reaction in the absence of light when making large batches. Disodium hydrogen phosphate was employed to provide an alkaline pH.

A portion of this solution was stirred with an amount of thionine sufficient to make the solution $10^{-3}$ molar. Five milliliters of this solution was then stirred with 0.5 ml. of 0.1 molar aqueous sodium p-toluenesulfinate. A clear, blue, medium-viscosity solution was obtained. The solution was deaerated to remove entrapped oxygen in the dark by bubbling a stream of nitrogen through the solution before exposure. Experimentally, deaeration is preferred for best results. However, in properly prepared large batch-wise production, this may not be necessary.

Upon exposure to room light illuminated by fluorescent bulbs, the solution set to a hard gel in seven seconds. After setting to a gel, a moderately strong exothermic reaction developed and the dye sensitizer bleached to give a clear, colorless mass of insoluble, infusible polymer. As herein provided, it will become apparent and recognized that extraneous and controlled color addition in conjunction with control of imaging polymerization and fixing polymerization (differential polymerization) can now effect the production of solid multipolymer films containing a coloring agent or agents.

EXAMPLE II

As exemplified in FIG. 1, imaging exposure of a non-transparent negative 10 having moon-shaped opening 13 and star-shaped openings 14 therein projected by light rays, from a conventional projection light 16, onto a thin film 15, formed of the deaerated solution above, entrapped between transparent glass plates sealed by a peripheral shim, provided the lighted areas which polymerized and the more shaded areas remained temporarily unpolymerized. When the films were heated to a condensation temperature of between 50° to about 80° C., the condensation polymerized portion retained the coloring dye after exposure to room light. Thus, providing a differentially polymerized colored film image 15$^1$ viewable by optical projection and reflection.

If desired, the light means 16 may be replaced with ultraviolet or modified with ultraviolet rays and the photosensitive composition may be modified with suitable soluble phototropic dye material preferably in the alkaline photosensitive compositions, as a latent coloring. Further, in appropriate photosensitive composition, as described herein, I may desire to include a photocatalyst densitizer active in the ultraviolet range as 5-nitro-o-toluic acid; 4,4′-dinitrobibenzyl-2,2′-dicarboxylic acid; 4-(4-nitrobenzyl benzoic acid; 4-nitrophenylacetic acid; 4-nitrohomophthalic acid; and the like, including the soluble barium, sodium, potassium, lithium, calcium, zinc, silver, aluminum and the like salt derivatives and mixtures of same having the property of densensitizing ultraviolet irradiated imaging areas. Thus, as will be recognized, the combinations of differential polymerization may be affected by personal control and manipulation in any combination and operable order desired to obtain photocopies in latent and positive imaging.

As indicated, the modified or unmodified photosensitive component mixtures, before or after prepolymer condensation may be prepared with the photosensitive dye material for exposure to image pre-addition polymerization and subsequent fixing by condensation polymerization, or in the alternative imaging by condensation polymerization and fixing by addition polymerization, it being understood that the respective polymerizations are relative to the light exposure and heat exposure for maintaining the polymerization differential, with or without the inclusion of coloring agent or agents as embodied herein.

Other similarly prepared sample mixtures of these photosensitive components and dye material likewise illuminated with animate and inanimate objects effected the objects reproduction therein. It was discovered that by varying the addition polymerization time, irradiation intensity, with different dye concentrations and mixtures of dyes, representative images of differing and varying colors were obtained. Likewise, by providing non-transparent objectives 13 and 14, or blocking the light from passing therethrough, with the balance of the negative being transparent, photo or light polymerization of lighted portion and condensation polymerization of the shaded portion effected image reproduction by differential polymerization. The results in either case may be effected sequentially or simultaneously in any desired order and in any single or combination of colors desired. The color and color concentrations may be varied by control of radiation and light intensity with corresponding control of initial or addition and condensation polymerization effecting color differential, with the photo image in the resultant film in multiple or color shade desired.

EXAMPLE III

The composition components of Example I, before prepolymerization were mixed with the dye in the proportions indicated, and several examples prepared in film form. These films were separately exposed, in separate order to transparent and non-transparent forms of the design projected thereon in the order of an application of the light and heat rays alternately applied in sequential order and simultaneously, to obtain a photocopy, in the differentially polymerized film as described. In other mixtures, with increased dye proportions, and similarly exposed, the colors were more differentially pronounced. The simultaneous application of a design in heat pattern in the presence of normal light effected an image reproduction by the differential polymerization. This was also possible in the reverse order of illuminating the design configuration with light and simultaneously heating the film. The replica resulting is more pronounced using an imaging beam or ray of strong intensity for effecting a design pattern.

Upon similar manner of exposure to light utilizing various filters, to control the imaging beams, different shadings were obtained in the projected pattern and retained upon the final differential (condensation) polymerization.

Several additional film samples were made using the photo-redox system with sole and different combinations of catalytically active and inactive dyes (in different and varying concentrations depending upon the depth of shade desired) as red and green, blue and yellow, effecting the production of yellow, green, etc. The active dyes appeared to be more or less bleached out by initial light imaging polymerization and that remaining therein more fixed by condensation polymerization. As indicated, replacing an infra red heat lamp for projection light 16 with simultaneous exposure of the film 15 to room light effected formation of the image and film 15′ by relatively simultaneous differential polymerization.

It was thus discovered that by the differential polymerization of the compositions embodied herein that different shading and combinations in color intensities of image replica can be effected by addition of more or less of the coloring material and control of addition polymerization with respect to exposure time and wavelength energy in combination with fixing by condensation polymerization. It will be recognized that the relative time relationships with respect to control of polymerization is dependent on the operator and his determinable choice of mixture and exposure times.

EXAMPLE IV

This example illustrates the condensation of a monohydric alcohol with my unique prepolymer to provide a modified prepolymer which is soluble in organic solvents and which is still highly photosensitive.

40 grams of the initial condensation polymer of Example I was mixed with 100 ml. of n-butanol. The mixture was heated under a condenser fitted with a Dean-Stark water trap and heated at the boiling point of the butanol-water azeotrope. Water was continually removed from the mixture and the butanol returned. When a considerable amount of water had been removed, about one gram of 85% phosphoric acid was added to produce an acid pH and heating was continued. When water ceased to come over, the reaction was terminated. A relatively non-viscous, clear solution of the light-sensitive butylated condensation polymer in butanol was secured.

A portion of this solution was mixed with that amount of thionine to give a solution $10^{-4}$ molar in the dye. Some of the clear, blue solution to which had been added sodium p-toluenesulfinate was deaerated by bubbling a stream of nitrogen through the solution for 30 minutes. Upon exposure to room light illuminated by fluorescent fixtures, the solution set to a hard gel in 15 seconds. The gel was clear and blue, but an exothermic reaction quickly developed and the blue dye bleached out to give a clear, colorless, infusible, insoluble polymer mass.

EXAMPLE V

Other additional portions of the above deaerated solution were prepared and variously treated with judicious use of additional and excess dye material and inorganic coloring pigments as titanium dioxide, red lead, zinc oxide and the like. These mixtures produced colored infusible, insoluble polymer masses, upon similar differential exposure, and the photosensitive dye in combination with the preferred catalyst system effected improved reproduction in photopolymer imaging.

Additional portions of the deaerated solution were thickened by evaporating off portions of the solvent and the remaining portions coated on various transparent and nontransparent plastic and paper backings and exposed to the design image, as illustrated. Where the projected light design exposure was reexposed to room light, the design was lost in mass polymerization. However, when subjected to differential polymerization by the combined use of addition and condensation polymerization, the image was retained.

Other thickening methods may be utilized as by addition of a conventional thickening agent or agents, as gelatin, soluble cellulose derivatives, salts thereof and the like, or further partial polymerization, with care being taken to retain photosensitivity. When thickened by further partial condensation polymerization, it is preferred to do this prior to the addition of the photosensitive polymerization catalyst material.

Further, in heat curing the organic solvent soluble modified photosensitive polymers, the curing may be completed in a shorter time interval by heating the composite to a higher temperature withing the limits as defined.

Thus, similar results in photopolymer image addition and condensation polymerization may be obtained with the above composition, or otherwise resinous films are provided in unmodified or modified forms of photosensitive compositions with multiple polymerization as embodied herein.

As shown by the foregoing description and examples, I have disclosed the preferred composition of, and a method of making a unique photosensitive condensation prepolymer of moderate molecular weight comprising formaldehyde, an amide of olefinic carboxylic acid and cyanamide constituents, and the development thereof with or without modification. The photosensitive prepolymer of my invention is soluble and fusible but, when uniformly irradiated with light of appropriate wavelengths in the presence of a photopolymerization catalyst, cures to a hard, infusible, insoluble photopolymer. The utility of my prepolymers is enhanced by condensing the prepolymers with alcohols to provide modified prepolymers which are soluble in numerous organic solvents. Photopolymerization of my prepolymers may be made extremely rapid by employing the photo-redox catalysts of my co-pending applications preferably in a substantially formaldehyde-free, light-sensitive composition. Further and preferably, addition photopolymerization of the component mixture by illumination therewith of a suitable object or negative with visible light, effects image reproduction by addition polymerization, which is fixed in composite film form by condensation polymerization, or conversely imaging may be effected by non-visible radiation and fixed by visible radiation. For example, in films formed of the composite compositions of Examples I and II, before condensation polymerization, there is produced photopolymer images therein and thereon by illuminating a negative and casting its reflection thereagainst. Under the influence of further light, the mass becomes polymerized. However, to preserve the image after its reproduction or impression, the film is treated as by heating to effect condensation polymerization of the balance of the mixture unpolymerized by the addition polymerization. Thereby effecting an image reproduction in a resinous film by one form of polymerization with hardening by a differential polymerization, or otherwise alternating the processing, or simultaneously effecting the differential polymerization of the photosensitive monomer or polymer compositions with retention of an image in a selective color or combination of colors.

While certain embodiments are disclosed herein, modifications which lie within the scope of this invention, will occur to those skilled in the art. I intend to be bound only by the scope of the claims which follow.

What is claimed is:

1. A method for producing a photopolymer image in photopolymerizable composition comprising the steps of:
(a) irradiating a light sensitive admixture comprising (1) a photosensitive composition of moderate molecular weight polymers of (A) a formaldehyde material, (B) an amide or amino salt of an olefinic carboxylic acid and (C) a cyano derived material in substituted or unsubstituted aliphatic amine or amide form selected from the group consisting of thiourea, urea, purine, biuret, guanidine, triazine, maleic acid and succinamide, including melamine, dicyanodiamide, aminoguanidine, guanimines, biguanide, N-aminourea, isothiourea, isourea, N-aminomelamine, substituted derivatives of barbituric acid, guanamides, guanylhydrazine, dicyanimide, and mixtures thereof, and (2) a photopolymerization initiator, with,
(b) imaging forming radiation in the ultraviolet region or actinic light in the visible range to activate said initiator in a selected area portion of said composition and thereby polymerize said mixture to a photopolymer state in said selected area.

2. The method of claim 1 including the step of in-situ fixing the remaining area of the polymer admixture to a hard insoluble state relative to the said selected image area of polymerization.

3. The method of claim 1 wherein the photosensitive composition is a prepolymer composition of A, B, and C in combination with mixtures of said materials containing soluble salt derivatives thereof selected from the group consisting of mono- and polyvalent metal salts and including polyvalent metal salts of acrylic and methacrylic compounds.

4. The method of claim 1 wherein said photosensitive polymers of A, B and C are reacted products of A, B, and C with a monohydric alcohol in the substantial absence of water and at a pH below about 7.0 prior to effecting the admixture of (1) said prepolymer with said (2) photopolymerization initiator.

5. The method of providing a resinous photopolymerized film composition containing separate areas of imaging polymers and image fixing polymers comprising:
(1) preparing a photosensitive mixture comprising (A) a solvent soluble mixture of photosensitive addition and condensation polymerizable components derived from the copolymerization of a formaldehyde material, an amide of an olefinic carboxylic acid including derivatives and mixtures thereof and a cyanamide derivative material in amine or amide form and (2) mixing therewith (B) a photosensitive photopolymerization-initiating catalyst operative in the radiation range of about 200 A. to about 7200 A., and (A) irradiating a selected area of said prepared photosensitive mixture in said range effecting imaging polymerization and (B) irradiating another area of said prepared photosensitive mixture with heat or light in another wavelength range than said imaging irradiation and effecting an area of fixing polymerization of said film composition.

6. The method of claim 1 wherein the photosensitive composition comprises condensation polymers of melamine and formaldehyde modified by an acrylamide material and including the combination of steps of initiating a polymer image reproduction in a selected area of said composition and fixing said image reproduction by different polymerization in a different area of said composition than said selected area.

7. The method of claim 5 including mixing with (1) and (2) a coloring agent.

8. The method of providing photopolymer imaging in a photosensitive prepolymer film composition of a mixture of moderate molecular weight addition polymerizable and condensation polymerizable polymers of cyanamide-formaldehyde-acrylamide substituents in combination with a light active polymer polymerization catalyst, the steps comprising:

(1) effecting addition photopolymerization of said polymers in a selected image producing area of said composition and (2) effecting condensation polymerization in another area of said composition, whereby said addition polymerization is in separate adjacent relationship to said condensation polymerization.

References Cited

UNITED STATES PATENTS

| | | | |
|---|---|---|---|
| 3,330,659 | 7/1967 | Wainer | 96—115 |
| 2,673,151 | 3/1954 | Gerhart | 96—115P |
| 3,097,096 | 7/1963 | Oster | 96—35.1 |
| 3,331,761 | 7/1967 | Mao | 204—159.23 |
| 3,050,390 | 8/1962 | Levinos et al. | 96—35.1 |
| 3,368,900 | 2/1968 | Burg | 96—115P |
| 3,147,116 | 9/1964 | Roth | 96—115 |
| 3,418,295 | 12/1968 | Schoenthaler | 96—115 |

NORMAN G. TORCHIN, Primary Examiner

E. C. KIMLIN, Assistant Examiner

U.S. Cl. X.R.

96—115